L. A. WATSON.
SYSTEM OF ELECTRICAL DISTRIBUTION.
APPLICATION FILED SEPT. 19, 1919.
1,389,328.  Patented Aug. 30, 1921.
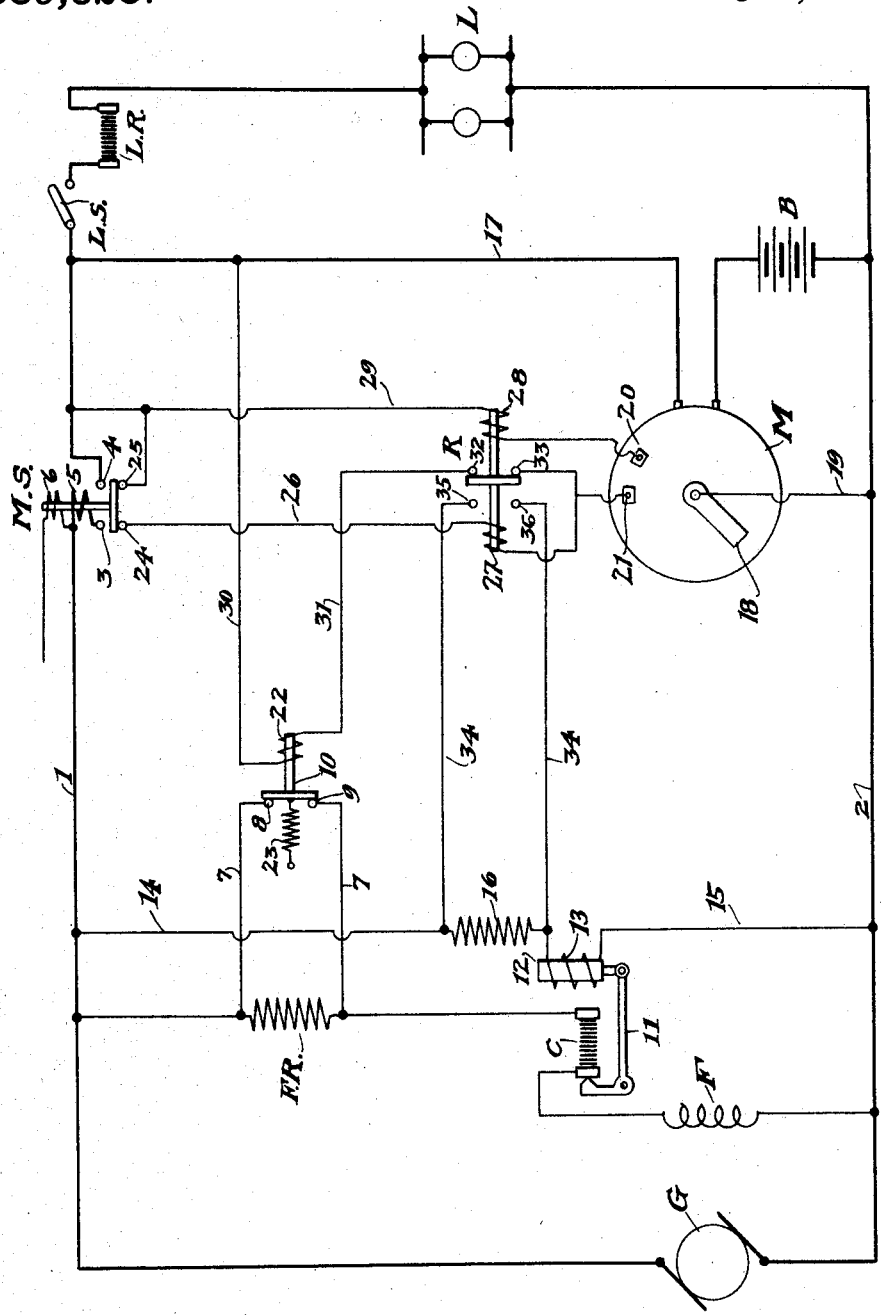

UNITED STATES PATENT OFFICE.

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,389,328.          Specification of Letters Patent.      Patented Aug. 30, 1921.

Application filed September 19, 1919. Serial No. 325,002.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and is directed more particularly to an improved system of the character referred to wherein a storage battery is associated to be charged by a generator.

The accompanying drawing illustrates a simplified wiring diagram of an exemplary embodiment of the invention, shown as a railway car lighting system including a variable speed generator, a storage battery adapted for connection to be charged thereby, and lamps adapted for connections to be supplied by the generator or by the battery under certain conditions.

It is an object of the invention to provide an improved and simple system of the character mentioned wherein the output of the generator is automatically controlled and regulated, within pre-selected limits, to charge the battery while also preventing injurious battery over-charging.

It is a further object to improve, in structural and functional respects, systems heretofore known.

Other objects and advantages of the present invention will be in part noted hereinafter in connection with the following more detailed description of the accompanying drawing.

As shown, the system includes an axle driven variable speed generator G having a shunt field winding F, which latter has in series therewith at all times a variable resistance, such as a carbon pile C, and also has in series therewith, under certain conditions, a relatively heavy fixed resistance FR. The generator is adapted for connection, by main lines 1 and 2, with a storage battery B and with lamps L. An automatic main switch MS may be provided to control the circuit across contacts 3, 4 in the line 1 and is designed for action, in a well understood way, by coöperative current coil 5 and voltage coil 6 to connect the generator to the battery when and while the voltage of the generator (dependent on the strength of field F and on the driven speed) exceeds a predetermined value, and to disconnect the generator and battery when the generator voltage is less than a predetermined value. The lamps L may be controlled by a lamp switch LS and also by individual lamp switches where desired, and a suitable lamp regulator LR is provided to govern and maintain constant the voltage applied on the lamps when the latter are supplied by the generator or by the battery.

In normal continued operation the resistance FR, which is a "killing" resistance, is short-circuited by lines 7 across contacts 8, 9 of a relay switch 10 and, in order to control the output of the generator as against driven speed changes, and preferably, also, as against gradual changes in the counter E. M. F. or state of charge of the battery, and against load changes, the degree of compression of the carbon pile regulating resistance C is governed through a lever 11 and a core 12, the movement of which is controlled by an electro-responsive coil 13 connected across the lines 1 and 2 by leads 14 and 15. During battery charging, particularly during the final period of battery charging, the coil 13 has in series therewith a resistance 16, and during the time mentioned coil 13 acts with a tendency to maintain relative constancy of generator voltage.

A meter M, which may be an ampere hour meter, is connected in the battery line 17 and is affected by the charging and discharging current to indicate the instant state of battery charge by current measurement. This meter may have a pointer 18 connected by lead 19 to the line 2 and rotatable counter-clockwise on charge to engage, prior to completion of the charge, a fixed contact 20 and thereafter, at the end of the charge, a terminal contact 21. Means including a relay R is provided to control the resistance 16 and thereby the setting of the generator regulator; and means including a coil 22 operative to open relay 10 against a closing spring 23 is provided to govern the "killing" resistance FR. The relay 10 is under the control of meter M and the relay R is under the control of an electro-responsive device acting in accordance with predetermined diminishments of generator voltage. As shown, the electro-responsive device just mentioned is constituted by the main switch MS, the latter, in opening, closing a circuit across contacts 24, 25 in the lead 26 of a coil 27 of relay R. An opposite coil, 28, of the relay, is adapted for connection across the battery by leads 29 and 19, under certain conditions. Coil 22 of relay 10 is adapted for connection across the battery by leads 30 and 31, the latter including contacts 32 and 33 governed by relay R, and the resistance 16 also adapted for short-circuiting by line 34 across contacts 35 and 36, also controlled by relay R.

A functional working of one design of the parts and their connections as hereinabove described may be briefly described as follows. Assuming the battery charge to be low, and the train at rest or the generator voltage too low for the supplying of useful current, the main switch MS is open to break the line 1, the regulating coil 13 is consequently ineffective but is set with the resistance 16 in series, relay R is positioned to close the break across contacts 32 and 33, and the relay 10 short-circuits the fixed resistance FR of the field F. When, thereafter, the train starts or the generator voltage rebuilds sufficiently, the main switch MS closes the break in line 1 and charging current is delivered to the battery B at a rate dependent on the battery state of charge and on the value of generator voltage constancy maintained by the coil 13. This continues until the movable contact 18 of the meter M rotates counter-clockwise on charge to engage contact 21, (having first engaged and passed over contact 20 without effect, due to the construction of relay R, which maintains its instant position, then bridging contacts 32 and 33, and unaffected by the then interval of energization of coil 28.) Engagement of meter contacts 18 and 21 thus connects the coil 22 of relay 10 for energization across the battery and the relay is actuated to break the short circuit 7 about fixed resistance FR, thereby inserting this resistance in series with the field F and abruptly decreasing the strength of the field winding to such an extent that the generator is "killed," that is to say, its voltage is reduced below a predetermined value permitting deliverance of useful current, and the main switch MS consequently drops to open the line 1 across contacts 3 and 4. It will be observed that the function of the meter M to insert a killing resistance in series with the generator field winding and disconnect the generator from the battery follows certain features of the prior art. In the present system, however, the opening of the main switch MS, due to the diminishment of the generator voltage on "killing," closes the break across contacts 24, 25 in the lead 26 of the coil 27 of relay R, and coil 27, thus connected across the battery, is energized to move the relay switch element first to break the circuit across the contacts 32 and 33, thereby freeing coil 22 of relay 10, and then closing the break across contacts 35 and 36 to complete the short circuit 34 about resistance 16, theretofore in series with the voltage regulating coil 13. As a result of the reclosure of the relay 10 the strength of the generator field F is restored and the generator voltage re-built to effect reclosure of the main switch MS across contacts 3, 4 of line 1, and the generator is, so to say, revived for the supply of further useful current, as required. The regulation of the generator, however, is then effected by the coil 13, relatively strengthened through the elimination of the effect of resistance 16, so that the regulator acts to maintain relative constancy of generator voltage at a predetermined reduced value, whereby, on account of the C. E. M. F. of the battery, protection of the latter against overcharge is afforded.

Assuming thereafter a continued period of battery discharge, for example, during a period of lamp load with the train at rest, meter contact 18 rotates reversely, that is clockwise, to engage contact 20 and effect the energization of coil 28 of relay R, whereby the latter moves to break the circuit across contacts 35, 36 in the shunt 34 about resistance 16 (re-inserting said resistance in series with coil 13) and closing the break across contacts 32, 33 of the coil 22 of relay 10. It will be observed that the actuation of the relay R in both directions occurs during the regulating ineffectiveness of the generator regulating coil 13, that is to say, occurs at a time of low generator voltage with the main switch MS opening the line 1. It will further be observed that the ampere hour meter M, when indicating a completed charge of the battery, renders the generator G functionally inoperative by the insertion of the killing resistance FR in series with its field F and that the succeeding action of the system, whereby the regulator coil 13 is re-set, is effected wholly by the main switch MS or elements under its control.

It is to be understood that certain features of the invention as hereinabove described, and especially as illustrated in the accompanying drawing, are susceptible of embodiment in other forms and are capable of combination with systems including generator regulators of other well-known character, and that such modifications and combinations may be effected without sacrifice of advantages of this invention and without departure from the scope of the appended claims.

Having described my invention, what I claim as new and desire to secure by Letters Patent, is:—

1. In an electrical system of distribution, in combination, a variable speed generator having a shunt field winding; a relatively heavy resistance adapted to be included in series with the field winding of said generator for reducing the generator voltage below a predetermined value; means indicative of the state of battery charge by measurement of the charging and discharging current and adapted to effect the inclusion of said resistance in the circuit of said field; winding means responsive to generator voltage to act upon the diminishment of such voltage below said predetermined value as described; and means controlled by said last-mentioned means, in acting, to exclude said fixed resistance from the circuit of the field winding of said generator and permit a re-increase of the generator voltage above said predetermined value.

2. In an electrical system of distribution, in combination, a variable speed generator having a shunt field winding, a relatively heavy resistance adapted to be inserted in the circuit of the field winding of the generator to render the latter functionally inoperative and to be excluded from the circuit of said field winding to permit the functional operativeness of said generator, a battery adapted for connection to be charged by said generator, an ampere hour meter connected in the battery circuit and indicative of the state of battery charge by current measurement and adapted to control the inclusion of said resistance in the circuit of the field winding of said generator for the purpose set forth, and means responsive to generator voltage and acting upon the diminishment of such voltage due to said inclusion of said resistance to reëxclude said resistance from the circuit of the field winding of said generator and permit resumed functional operativeness of the latter.

3. In an electrical system of distribution, in combination, a variable speed generator having a shunt field winding, a relatively heavy resistance adapted to be included in the circuit of the field winding of said generator for rendering the latter functionally inoperative and for exclusion from said circuit for permitting functional operativeness of said generator, a battery adapted for connection to be charged by said generator, a regulator for said generator including a coil tending to maintain relative constancy of generator voltage during an extended period of final battery charging, a meter indicative of instant state of battery charge by current measurement and adapted to control the inclusion of said resistance in the circuit of the field winding of said generator for the purpose mentioned, and means influenced by generator voltage and acting upon the diminishment of such voltage due to the inclusion of said resistance by said meter to effect sequentially reëxclusion of said resistance and strengthening of said regulator.

4. In an electrical system of distribution, in combination, a variable speed generator having a shunt field winding, a relatively heavy resistance adapted to be included in the circuit of the field winding of said generator for diminishing the voltage of the latter to an extent which renders the generator functionally inoperative and for exclusion from said circuit to permit functional operativeness of said generator, a battery adapted for connection to be charged thereby, a regulator for said generator including a coil connected across the generator mains and acting to maintain relative constancy of generator voltage as against speed changes and as against changes in the state of battery charge during the period of functional operativeness of said generator, a meter connected in the battery branch indicative of the state of battery charge by current measurement, automatic means responsive to generator voltage and actuated upon diminishment of such voltage due to the inclusion of said resistance in the circuit of the field winding of said generator, and a relay connected for control by said meter to effect the inclusion of said resistance as described and connected for control by said automatic means to effect the exclusion of said resistance for the purpose described.

5. In an electrical system of distribution, in combination, a variable speed generator having a shunt field winding, a relatively heavy resistance adapted to be included in the circuit of the field winding of said generator for diminishing the voltage of the latter to an extent which renders the generator functionally inoperative and for exclusion from said circuit to permit functional operativeness of said generator, a battery adapted for connection to be charged thereby, a regulator for the generator including a coil connected across the generator mains and acting to maintain relative constancy of generator voltage as against speed changes and as against changes in the state of battery charge during the period of functional operativeness of said generator, a meter connected in the battery branch indicative of the state of battery charge by current measurement, automatic means responsive to generator voltage and actuated upon diminishment of such voltage due to the inclusion of said resistance in the circuit of the field winding of said generator, and a relay connected for control by said meter to effect the inclusion of said resistance as described and connected for control by said automatic means to effect the exclusion of said resistance for the purpose described, said relay being also connected for control by said automatic means to affect said regulator.

6. In an electrical system of distribution, in combination, a variable speed generator having a shunt field winding, a relatively heavy resistance adapted to be included in the circuit of the field winding of said generator for diminishing the voltage of the latter to an extent which renders the generator functionally inoperative and for exclusion from said circuit to permit functional operativeness of said generator, a battery adapted for connection to be charged thereby, a regulator for the generator including a coil connected across the generator mains and acting to maintain relative constancy of generator voltage as against speed changes and as against changes in the state of battery charge during periods of functional operativeness of said generator, a meter connected in the battery branch indicative of the state of battery charge by current measurement, automatic means responsive to generator voltage and actuated upon diminishment of such voltage due to the insertion of said resistance in the circuit of the field winding of said generator, and a relay connected for control by said meter to effect the inclusion of said resistance as described and connected for control by said automatic means to effect the exclusion of said resistance for the purpose described, said relay also being connected for control by said automatic means to so affect said regulator as to depress the value of voltage constancy thereafter maintained by the same during succeeding functional operativeness of said generator.

7. In an electrical system of distribution, in combination, a variable speed generator having a shunt field winding, a relatively heavy resistance adapted to be included in the circuit of the field winding of said generator for diminishing the voltage of the latter to an extent which renders the generator functionally inoperative and for exclusion from said circuit to permit functional operativeness of said generator, a battery adapted for connection to be charged thereby, a regulator for the generator including a coil connected across the generator mains and acting to maintain relative constancy of generator voltage as against speed changes and as against changes in the state of battery charge during periods of functional operativeness of said generator, a meter connected in the battery branch indicative of the state of battery charge by current measurement, automatic means responsive to generator voltage and actuated upon diminishment of such voltage due to the insertion of said resistance in the circuit of the field winding of said generator, and a relay connected for control by said meter to effect the inclusion of said resistance as described and connected for control by said automatic means to effect the exclusion of said resistance for the purpose described, the actuations of said relay under the control of said automatic means occurring during an interval of functional inoperativeness of said generator.

8. In an electrical system of distribution, in combination, a variable speed generator, a battery adapted for connection to be charged thereby, a regulator for said generator effective during battery charging, automatic means responsive to generator voltage and actuated upon a predetermined diminishment of such voltage under certain conditions to affect said regulator, and means to effect said diminishment of generator voltage at the completion of battery charging.

9. In an electrical system of distribution, in combination, a variable speed generator, a battery adapted for connection to be charged thereby, a meter connected to indicate the instant state of battery charge by current measurement, a regulator for said generator effective during battery charging, automatic means responsive to generator voltage and actuated upon a predetermined diminishment of such voltage under certain conditions to affect said regulator, and means including said meter to insure said diminishment of generator voltage upon a predetermined charge of said battery.

In testimony whereof I affix my signature, in the presence of two witnesses.

LEONARD A. WATSON.

Witnesses:
 HELEN M. SEAMANS,
 DAVID A. WOODCOCK.